United States Patent [19]

Matsuda et al.

[11] 4,040,294
[45] Aug. 9, 1977

[54] APPARATUS FOR DETECTING MISFIRE IN MULTICYLINDER INTERNAL COMBUSTION ENGINE

[75] Inventors: Yasumasa Matsuda, Hitachi; Ichiro Kimura, Mito; Akio Sagawa; Tsutomu Hiramatsu, both of Hitachi, all of Japan

[73] Assignee: Hitachi, Ltd., Japan

[21] Appl. No.: 727,852

[22] Filed: Sept. 29, 1976

[30] Foreign Application Priority Data

Oct. 3, 1975    Japan .................................. 50-118833

[51] Int. Cl.² ............................................. G01M 15/00
[52] U.S. Cl. ........................................ 73/117.3; 60/277
[58] Field of Search .................. 73/116, 117.3; 60/277

[56] References Cited

U.S. PATENT DOCUMENTS

| | | | |
|---|---|---|---|
| 3,908,366 | 9/1975 | Masaki | 60/289 X |
| 3,965,677 | 6/1976 | Goto et al. | 60/277 |
| 3,977,239 | 8/1976 | Hulls et al. | 73/115 |

Primary Examiner—Jerry W. Myracle
Attorney, Agent, or Firm—Craig & Antonelli

[57] ABSTRACT

An apparatus for detecting misfire in a multicylinder internal combustion engine, comprising a sound pick-up transducer disposed in the exhaust passage of the engine or a chamber communicating with the exhaust passage for the purpose of detecting exhaust sound, an integrating circuit for integrating an electric output of the transducer in synchronism with the rotation of the engine and a comparison circuit for comparing the output of the integrating circuit with a reference signal, thereby misfire being detected on the basis of an output of the comparison circuit.

24 Claims, 14 Drawing Figures

REFERENCE LEVEL

FIG. 8
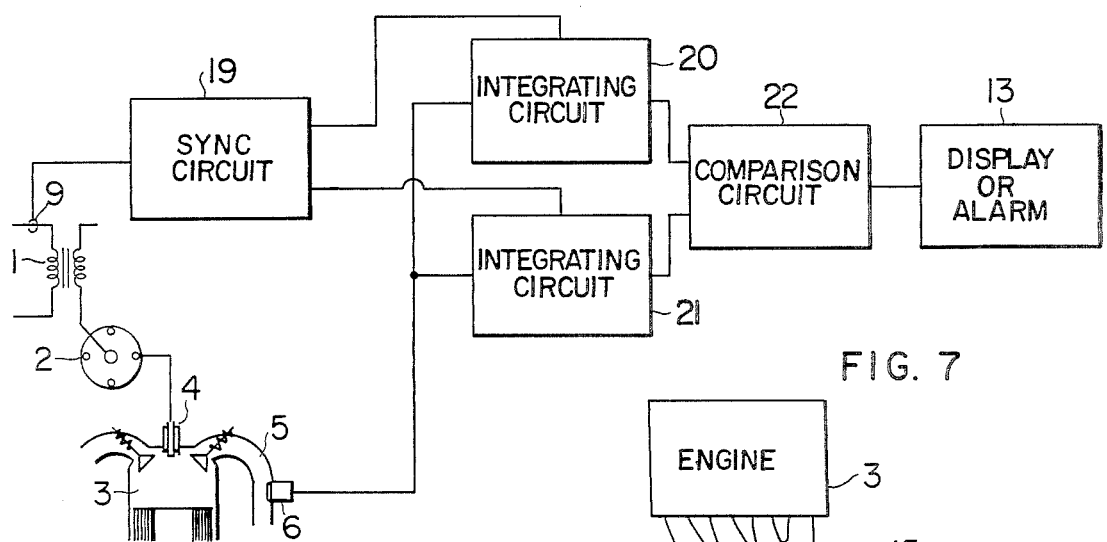
FIG. 7
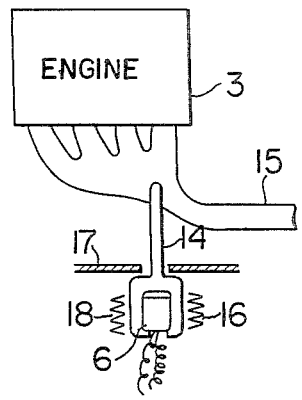
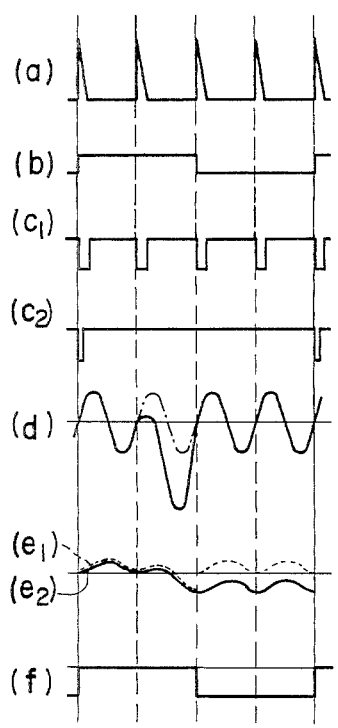
FIG. 9A
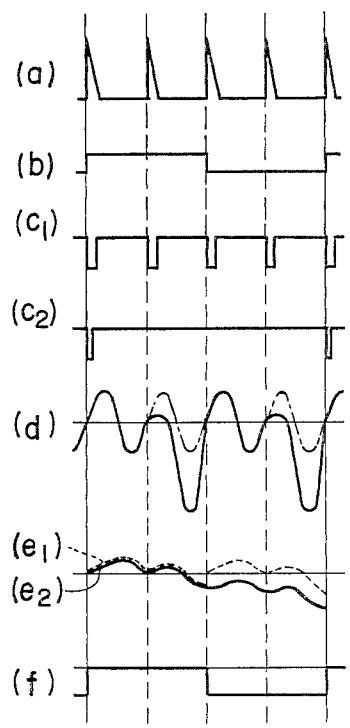
FIG. 9B
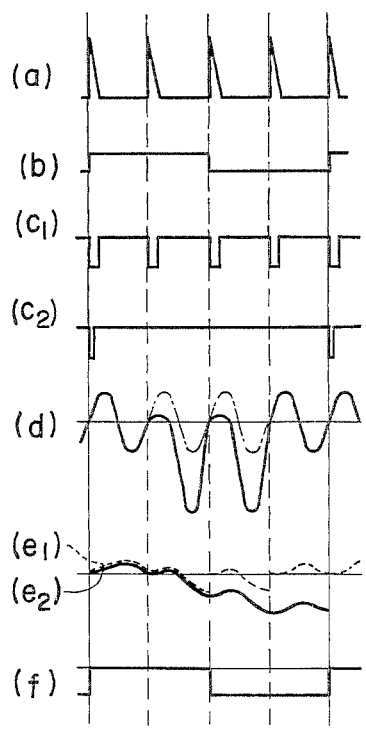
FIG. 9C

APPARATUS FOR DETECTING MISFIRE IN MULTICYLINDER INTERNAL COMBUSTION ENGINE

BACKGROUND OF THE INVENTION

1. Field of the Invention

The present invention relates to an apparatus for detecting misfire in a multicylinder internal combustion engine and more particularly to an apparatus for detecting misfire, which checks, by detecting the change in the tone of the exhaust sound, whether there is misfire or not.

2. Description of the Prior Art

With an internal combustion engine having a catalyzer converter as an anti-pollution mechanism for exhaust gas in the intermediate portion of the exhaust passage, misfire in the cylinder produces unburnt gas, which is introduced into and often burns in the converter to damage the converter. In order to prevent the burning of the catalyzer converter, it is customary to drive a protecting device into operation by detecting a temperature rise in the converter. It, however, is more efficient to detect the occurrence of misfire earlier so that the protecting device may quickly respond to the accident or that the driver may be informed of the accident earlier.

As one of the conventional devices for detecting misfire is known a system which detects misfire by detecting the temperature of exhaust gas by thermoelectric transducers. With this system, it is necessary, to detect the change in the temperature of exhaust gas with high accuracy, to dispose the thermoelectric transducers in the exhaust passages in the vicinity of the respective exhaust ports of the cylinders. Accordingly, there must be provided a plurality of detecting elements, i.e. thermoelectric transducers, and the system must be so constructed as to be resistive to heat and therefore the system has a drawback of high cost. Furthermore, in case of detecting misfire by detecting the change in temperature, there is also a drawback that the response to the misfire is rather slow since only one occurrence of misfire cannot cause an appreciable temperature change but since it is only after several successive occurrences of misfire that the temperature of exhaust gas changes to a detectable degree.

On the other hand, the specification of the U.S. Pat. No. 3,540,262 discloses a system which acoustically detects the knocking and other abnormalities of the engine. According to the disclosed system, the electric signal obtained by detecting the exhaust sound by a microphone is merely displayed visually on, for example, a cathode ray tube. For this purpose, detector transducers for detecting the vibrations and the pressures due to knocking etc. must be provided at several points in or on the engine so as to detect the occurrence of knocking etc. so that the system becomes costly.

SUMMARY OF THE INVENTION

The object of the present invention is to provide an inexpensive apparatus for detecting misfire, having a better response characteristic.

The present invention is characterized in that a sound pick-up transducer is placed in the exhaust passage or in a chamber communicating with the exhaust passage, the electric output of the sound pick-up transducer is integrated in synchronism with the rotation of the engine, the integrated quantity is compared with a reference value, and the occurrence of misfire is detected when the integrated value becomes smaller than the reference value.

BRIEF DESCRIPTION OF THE DRAWING

FIG. 7 shows an example of provision of a sound pick-up transducer according to the present invention.

FIG. 8 shows in block diagram an apparatus for detecting misfire, as another embodiment of the present invention.

FIGS. 9A to 9C show waveforms for explaining the operation of the device shown in FIG. 8.

DESCRIPTION OF THE PREFERRED EMBODIMENT

Figure 1:
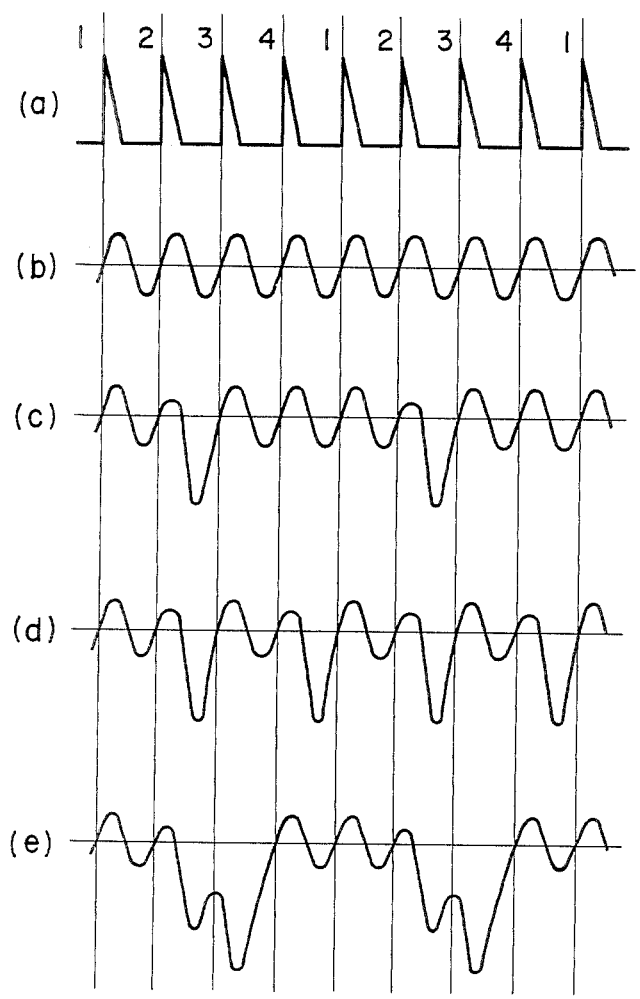
FIG. 1 shows waveforms of an output of a sound pick-up transducer placed in the exhaust passage of an internal combustion engine.

FIG. 1 shows the relationship between misfire and associated exhaust sound in a four-cylinder engine, diagram (a) indicating electric pulses applied successively to the ignition plugs of the respective cylinders and diagrams (b) – (e) designating the waveforms of the electric outputs of a sound pick-up transducer such as a microphone, which receive the exhaust sound. The output of the microphone is obtained as deviation from the average of the input level of the microphone. Diagram (b) corresponds to the normal state, i.e. where there is no misfire phenomenon, in which the exhaust sounds from the respective cylinders are stable and diagrams (c) – (e) indicate the output signals typical of the case where misfire is taking place. The diagram (c) tells that misfire is taking place in the second cylinder, the level of the exhaust sound from the second cylinder being depressed while the diagrams (d) and (e) correspond respectively to the case where misfire is taking place simultaneously in the second and the fourth cylinders and to the case where the second and the third cylinders are simultaneously suffering from misfire. Of course, other cases may be possible, but they can be typified by the above three cases. If misfire takes place in more than two cylinders of a four-cylinder engine, the continuous running of the engine is difficult and in such a case the misfire is often detected by different methods.

Figure 2:
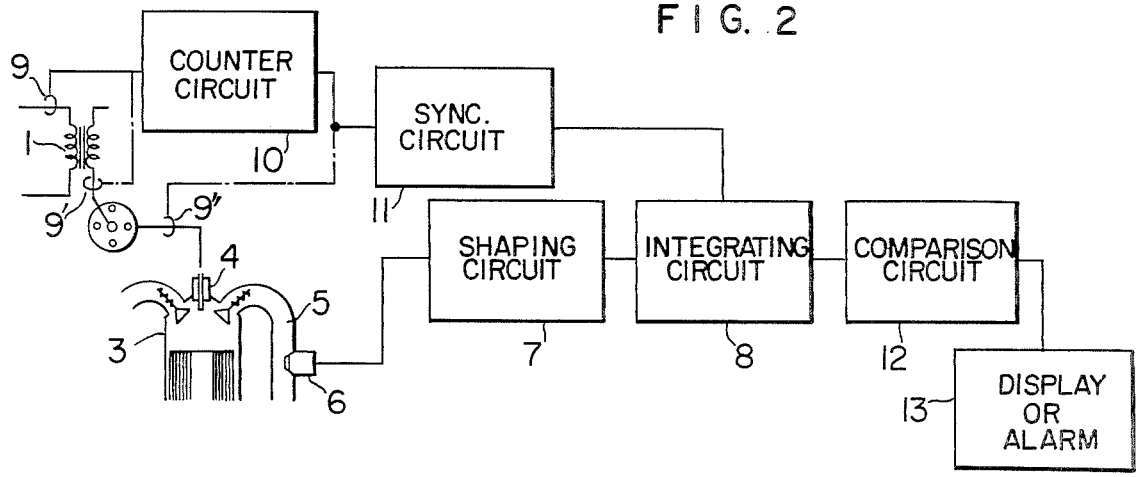
FIG. 2 shows in block diagram an apparatus for detecting misfire, as one embodiment of the present invention.

FIG. 2 shows an apparatus for detecting misfire as an embodiment of the present invention, in which are shown an ignition coil 1, a distributor 2, an engine body 3, an ignition plug 4 and an exhaust passage 5. The exhaust sound is detected by a sound pick-up transducer as a microphone 6 disposed in the exhaust passage 5 and the electric output of the microphone 6 is waveform-shaped by a waveform shaping circuit 7 so that the components other than those relevant to the exhaust sound are eliminated. The output of the waveform shaping circuit 7 is sent to an integrating circuit 8. The pulses generated by the ignition coil 1 are directly or indirectly detected and the number of the pulses are counted by a counter circuit 10. The counter circuit 10 triggers a synchronizing circuit 11 each time it receives a predetermined number of ignition pulses, e.g. every four pulses in case of a four-cylinder engine. Accordingly, the synchronizing circuit 11 generates a synchronizing signal having a predetermined period in synchronism with the rotation of the engine. The synchronizing signal is applied to the integrating circuit 8 so that the circuit 8 is reset to determine the integration period in synchronism with the rotation of the engine. The output of the integrating circuit 8 is compared in a comparison circuit 12 with a reference signal so as to check whether or not misfire is taking place in the engine. If there is misfire in the engine, the comparison circuit 12 delivers an output to actuate a display or warning circuit 13.

One of the methods of directly detecting the pulses generated in the ignition coil is such as providing the ignition coil with a terminal to be connected with the counter circuit 10. According to this method, however, in which the counter circuit 10 is fixedly connected with the ignition coil 1, the versatility in case of maintenance checking of the engine may be sacrificed and moreover since this method requires a part of the energy of the ignition pulse to be taken out for detecting purpose, each ignition pulse may be attenuated to such an extent that normal ignition cannot be maintained. From this point of view, it is preferable to detect the ignition pulses indirectly by means of a sensor 9 or 9′ provided in the vicinity of the primary or the secondary winding of the ignition coil 1, as shown in FIG. 2, and to connect the output of the sensor 9 or 9′ with the counter circuit 10. Alternately, a sensor 9″ may be placed in the vicinity of the conductor connecting the distributor 2 and one of the ignition plugs 4. The last case can enjoy a merit that the counter circuit 10 can be omitted.

Figure 3:
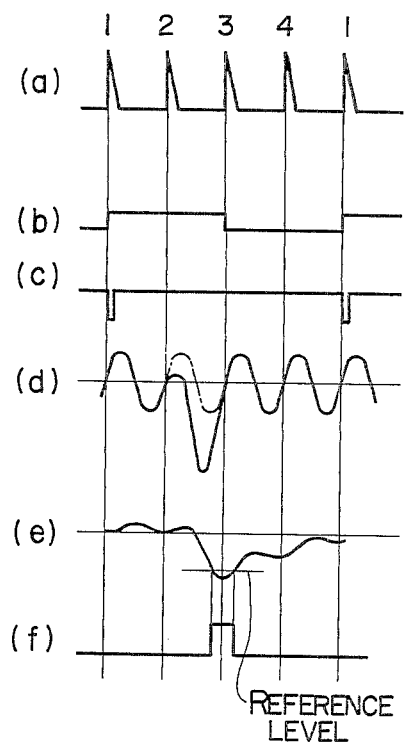
FIG. 3 shows waveforms for explaining the operation of the apparatus shown in FIG. 2.
Figure 4:
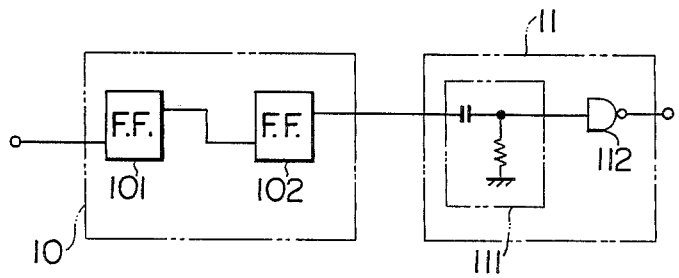
FIG. 4 schematically shows a counter circuit and a synchronizing circuit, used in the embodiment shown in FIG. 2.
Figure 5:
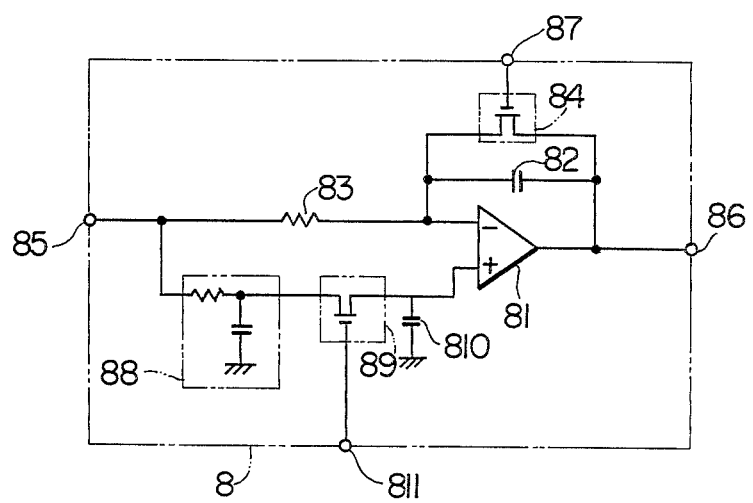
FIG. 5 shows an integrating circuit used in the embodiment shown in FIG. 2.

The operation of this embodiment will be described with the aid of FIGS. 3 to 6. FIG. 3 shows the case where misfire is taking place in the second cylinder of a four-cylinder engine, as shown in the diagram (c) of FIG. 1. The waveform of the output of the waveform shaping circuit 7 is as shown in the diagram (d) of FIG. 3. The waveform shaping circuit 7 may be in the form of, for example, a low-pass filter for filtering out noise due to higher harmonic components. The counter circuit 10 and the synchronizing circuit 11 may be constructed, for example, as shown in FIG. 4. The counter circuit 10 is composed of two flip-flops 101 and 102 and serves to quarter the period of the ignition pulses, to generate such a signal as shown in the diagram (b) of FIG. 3. The synchronizing circuit 11 serves to generate synchronizing pulse signal shown in the diagram (c) of FIG. 3 by means of a differentiating circuit 111 and a NAND element 112, in accordance with the signal (b) delivered from the counter circuit 10. The integrating circuit 8 comprises an amplifier 81, a capacitor 82, a resistor 83 and a switching circuit 84, as shown in FIG. 5. The switching circuit 84 serves to reset the integrating circuit 8. It receives at its terminal 87 the synchronizing pulses (c) delivered from the synchronizing circuit 11 so that the capacitor 82 is short-circuited. Accordingly, the integrating circuit 8 starts a new integration operation whenever it receives a synchronizing pulse so that the integration period is determined by the period of the synchronizing pulses (c). The output signal (d) of the waveform shaping circuit 7 is applied through an input terminal 85 to one of the input terminals of the amplifier 81, to be integrated. The integrated signal obtained at an output terminal 86 is shown in the diagram (e) of FIG. 3.

The zero level for integration operation, i.e. a signal of reference level to be applied to the other input terminal of the amplifier 81, can be fixed to a constant value if the dc level of the output of the microphone 6 is stable, but in case where the dc level of the output of the microphone 6 becomes unstable in a certain integration period and is shifted at the beginning of the next integration period, the amount of the shift must be compensated for integration operation. Since the amount of the shift is approximately expressed by the average of the integral taken during the previous integration period, it is necessary to compensate the reference level by the average of the integral taken during the immediately previous integration period. For this purpose, the integrating circuit 8 includes therein a smoothing or integrating circuit 88, a switching circuit 89 and a capacitor 810, as shown in FIG. 5. The smoothing circuit 88 serves to smooth the input signal applied to the input terminal 85, i.e. the waveform-shaped version of the output of the microphone 6, every integration period and to detect the amount of the shift in the dc level of the output of the microphone due to the change in the output of the microphone 6. The switching circuit 89 is rendered on when a synchronizing pulse is applied to its input terminal 811 and the detected amount of the shift is held in the capacitor 810. Simultaneously a synchronizing pulse is applied to the terminal 87 so that the integrating circuit 8 starts integration operation for a new integration period. The integration operation is performed on the basis of the reference level compensated in accordance with the amount of the shift in the dc level of the output of the microphone 6.

Figure 6:
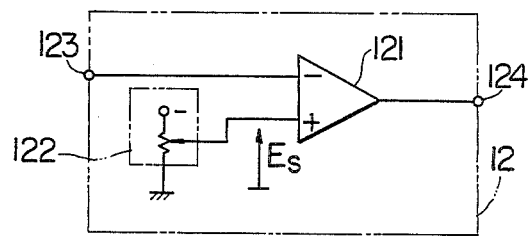
FIG. 6 shows a comparison circuit used in the embodiment shown in FIG. 2.

The comparison circuit 12 is constructed, for example, as shown in FIG. 6. The output (e) of the integrating circuit 8 is applied to an input terminal 123 and to one of the inputs of a comparator 121. The reference signal $E_s$ for comparison is generated by a reference signal generator 122 and applied to the other input of the comparator 121. The level of the reference signal is adjustable. The level of the reference signal is chosen to be a value larger by a suitable amount than the maximum of the change in the integrated waveform caused in the normal case where there is no misfire, in view of the influence of external noise up the waveform of the output of the microphone 6. The comparator 121 compares the output (e) of the integrating circuit 8 with the reference signal $E_s$ and delivers an output shown in the diagram (f) of FIG. 3, at its output terminal 124 when the output (e) is smaller than the reference signal $E_s$.

Although applied to the display or warning circuit 13, the output of the comparison circuit 12 may, if desired, be used as an input to a control circuit provided for other purpose than display or warning. In that case, the display or warning circuit 13 may be eliminated.

It is necessry for the microphone 6 to be located in such a position that the exhaust sounds from the respective cylinders may be detected at the same level and it therefore is preferable to place the microphone 6 in the exhaust pipe which the exhaust gas passes after the manifold. Alternately, to reduce the influence of heat of the exhaust gas upon the microphone 6, the microphone 6 may be placed in a sound detecting chamber 16 communicating through a small pipe 14 with an exhaust pipe 15, as shown in FIG. 7. With this structure, the flow of the exhaust gas into the sound detecting chamber 16 can be limited and moreover the temperature rise of the chamber 16 due to the exhaust gas can be suppressed by providing a thermal shielding plate 17 opposite to the exhaust passage 15 and by providing the side wall of the chamber with a heat radiator 18. On the other hand, the exhaust sound is propagated through medium, i.e. the exhaust gas in the small pipe 14, to the microphone 6 in the sound detecting chamber 16. Thus, a microphone having no special resistivity to heat, i.e. an ordinary, inexpensive microphone, can be used.

FIG. 8 shows an apparatus for detecting misfire, as another embodiment of the present invention, in which the same reference numerals are applied to like parts or elements as in FIG. 2. According to this embodiment, a microphone 6 is disposed in an exhaust passage 5 to detect the exhaust sound and the output of the microphone 6 is applied to two integrating circuits 20 and 21. The ignition pulses are detected by a sensor 9 and a synchronizing circuit 19 delivers two synchronizing signals having different period in accordance with a predetermined number of the detected pulses, so that the integrating circuits 20 and 21 are separately reset. The changes in the outputs of the two integrating circuits are compared with each other by a comparison circuit 22, whereby misfire can be detected. The output of the comparison circuit 22 is usually used to drive a display or warning circuit 13, but it may, if desired, be used as an input to a control circuit provided for other purpose than display or warning. It is preferable also in this embodiment to dispose the microphone 6 in a sound detecting chamber communicating through a small pipe with the exhaust passage, as described with FIG. 7.

Figure 10:
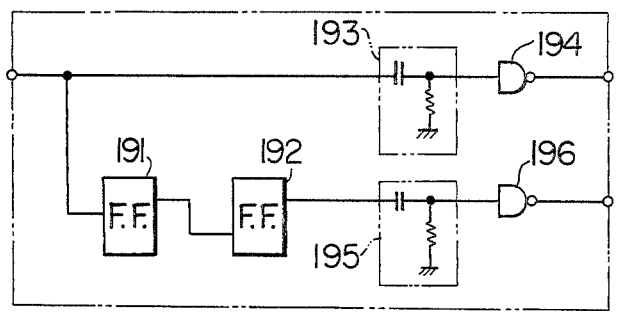
FIG. 10 shows a synchronizing circuit used in the embodiment shown in FIG. 8.

The operation of this embodiment will be described with the aid of FIGS. 9 to 12. FIG. 9A shows the case where misfire is taking place in the second cylinder of an engine having four cylinders, FIG. 9B the case where misfire is taking place in the second and the fourth cylinders of the four-cylinder engine, and FIG. 9C the case where misfire is taking place in the second and the third cylinders of the four-cylinder engine. In FIGS. 9A - 9C, diagrams (a) indicate electric pulses generated by the ignition coil and applied through the distributor 2 to the ignition plugs 4 of the respective cylinders 3. The pulses are detected by the sensor 9 and sent to the synchronizing circuit 19. The synchronizing circuit 19 may be constructed, for example, as shown in FIG. 10, incorporating therein flip-flops 191 and 192 which correspond to the flip-flops 101 and 102 (FIG. 4) constituting the counter circuit 10 used in the embodiment shown in FIG. 2. On the one hand, the detected ignition pulses are connected directly to the synchronizing signal shown in the diagram $(c_1)$ of FIG. 9, by means of a differentiating circuit 193 and a NAND element 194. On the other hand, the ignition pulses are applied to the flip-flops 191 and 192 and the flop-flops deliver signal shown in the diagram (b) of FIGS. 9. The signal (b) is differentiated by a differentiating circuit 195 and the output of the circuit 195 is applied to a NAND element 196, which generates a synchronizing signal shown in the diagram $(c_2)$ of FIGS. 9. The synchronizing signal $(c_1)$ has the same period as the ignition pulses while the synchronizing signal $(c_2)$ has a period equal to one quarter of that of the ignition pulses. The synchronizing signals $(c_1)$ and $(c_2)$ respectively reset the integrating circuits 20 and 21 to determine the integration periods thereof.

Figure 11:
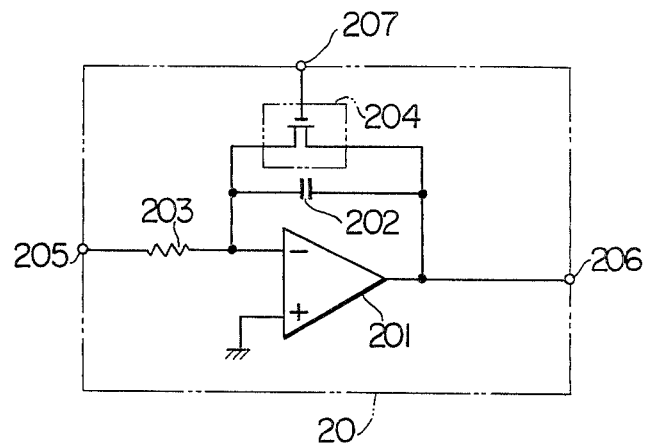
FIG. 11 shows an integrating circuit used in the embodiment shown in FIG. 8.

Diagram (d) of FIGS. 9 show the waveform of the output of the microphone 6 disposed in the exhaust passage 5. In the normal state where there is no misfire, the exhaust sounds from the respective cylinders are stable, the waveforms of the exhaust sounds nearly resembling sinusoidal waves as indicated by a dot-and-dashed line in the diagram (d). In the case where misfire is taking place, however, level of the exhaust sound is largely depressed and therefore the waveform of the output of the microphone 6 is as shown by solid line in the diagram (d). The output of the microphone is simultaneously applied to the integrating circuits 20 and 21, which in turn integrate the output of the microphone respectively over the integration periods determined by the synchronizing signals $(c_1)$ and $(c_2)$. The integrating circuit 20 may be constructed, for example, as shown in FIG. 11, comprising an amplifier 201, a capacitor 202, a resistor 203 and a switching circuit 204, and the operation of the circuit 20 is quite similar to that of the integrating circuit 8 in FIG. 5 expecting the smoothing circuit 88, the switching circuit 89 and the capacitor 810. Namely, the output of the microphone 6 applied to an input terminal 205 is integrated during the integration period determined by the synchronizing signal $(c_1)$ applied to a terminal 207 and the integrated signal is delivered as an output at an output terminal 206. The constitution of the integrating circuit 121 coincides with that of the integrating circuit 20.

The waveform shown by dotted curve in the diagram $(e_1)$ of FIG. 9 indicates the output of the integrating circuit 20. As shown in FIG. 9A, the output of the microphone 6 is largely lowered in the second integration period of the second integrating circuit 20 so that the dc level of the output of the microphone 6 fluctuates and that the zero level for integration operation in the third integration period shifts by an amount of the average of the integral taken during the second integration period. However, since the integration period is very short, the resulting influence is neglected in FIG. 9A. The same is true of FIG. 9B and FIG. 9C.

Figure 12:
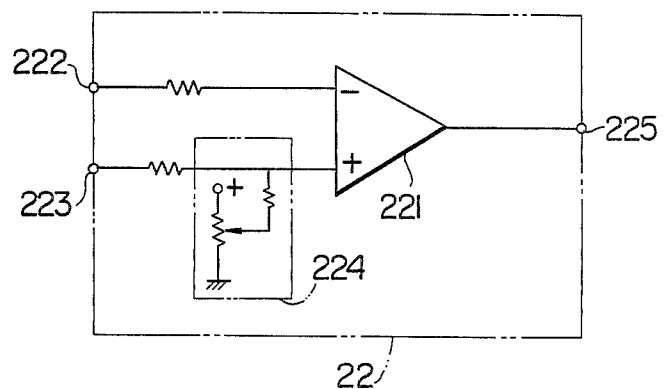
FIG. 12 shows a comparison circuit used in the embodiment shown in FIG. 8.

A solid undulating curve $(e_2)$ indicates the waveform of the output of the integrating circuit 21. The waveforms $(e_1)$ and $(e_2)$ of the outputs of the integrating circuits 20 and 21 are identical with each other in the case where no misfire is taking place and in the interval from the start of misfire to the instant at which the integrating circuit 20 is reset. However, if misfire takes place, for example, in the second cylinder as shown in FIG. 9A, the integrating circuit 20 is immediately reset and the third integration period sets in so that the waveform (d) in that period is integrated. Consequently, the waveform of the output of the integrating circuit 20 starts at about the zero level, as depicted by the dotted curve $(e_1)$. On the other hand, the integrating circuit 21 is not yet reset when the integrating circuit 20 is reset and therefore the integrating circuit 21 continues to integrate the waveform (d), the output waveform of the circuit 82 being depicted by the solid curve $(e_2)$. It therefore is seen that after the integrating circuit 20 has been reset immediately after the occurrence of misfire, the output level of the integrating circuit 21 is lower than that of the integrating circuit 20, that is, there arises a difference between the outputs of the circuits 20 and 21. In a similar manner, there also arises a difference between the outputs of the integrating circuits 20 and 21, in the cases shown in FIGS. 9B and 9C. Especially in the case where two adjacent cylinders suffer from misfire as shown in FIG. 9C, such a difference becomes large. The difference between the outputs of the integrating circuits 20 and 21 is detected by the comparison circuit 22. The comparison circuit 22 may be constructed, for example, as shown in FIG. 12. A comparator 221 has two input terminals 222 and 223 and an output terminal 225 and the output ($e_1$) of the integrating circuit 20 is applied to the input terminal 222 while the input terminal 223 receives the output ($e_2$) of the integrating circuit 21. A level adjusting circuit 224 is connected with the input terminal 223 and the level adjusting circuit 224 is so adjusted that a positive output may appear at its output terminal 225 when the outputs ($e_1$) and ($e_2$) are equal to each other or when, to prevent an erroneous operation due to external noise, the difference between the outputs ($e_1$) and ($e_2$) is smaller than a predetermined value. If the difference between the outputs ($e_1$) and ($e_2$) becomes equal to or larger than the predetermined value, a negative output will appear at the output terminal 225. Namely, the negative output indicates the occurrence of misfire so that the misfire can be detected. Diagram (f) in FIG. 9 designate the waveform of the outputs of the comparison circuit 22. The output of the comparison circuit 22 drives the display or warning circuit 13.

According to the foregoing description, the integrating circuits 20 and 21 were to be reset every ignition pulse or every four ignition pulses. However, the way of resetting the integrating circuits is not limited to this example. The integration period for each of the integrating circuits 20 and 21 can arbitrarily be determined in synchronism with the rotation of the engine. Incidentally, if the integration periods of the two integrating circuits are too near each other, the number of failures in detecting misfire will adversely increase. As shown in FIG. 9, the integration periods of the integrating circuits 20 and 21 are in the ratio of 1 : 4, that is, both the integrating circuits are reset simultaneously every four ignition pulses. Accordingly, in the case where misfire takes place in the fourth cylinder, the integrating circuit 21 is also reset when the integrating circuit 20 is reset immediately after the occurrence of the misfire. In this case, there is no difference between the outputs of the integrating circuits 20 and 21 so that the misfire cannot be detected. Such a failure in detection can be prevented by designing the integrating circuit 21 in such a manner that it is reset every $n$-th ignition pulse, where $n$ is a positive integer and different from the number of the cylinders. The degree of failure in detecting misfire can further be decreased by determining the number $n$ in such a manner that $n$ is prime to the number of cylinders. For example, $n$ should equal 3, 7, 9 or 11 etc. in case of a four-cylinder engine. This constitution is easily realized by modifying the counter circuit incorporated in the synchronizing circuit in a well-known manner.

The sound pick-up transducer, i.e. a microphone, 6 is disposed in the exhaust passage to detect the exhaust sounds from the respective cylinders. Accordingly, in the case where there is only one exhaust passage, only one transducer is needed. If there are plural exhaust passages, the number of the transducers to be used must be equal to that of the exhaust passages. Usually, however, the number of such exhaust passages is at most two so that only two transducers at most suffice for the purpose under consideration. Consequently, according to the present invention the resulting device can be constructed inexpensively. Moreover, the mounting of transducers on the engine does not require so much labor since only a few transducers are used. Furthermore, misfire can be detected without failure and with high degree of response since the exhaust sounds from respective cylinders are detected at only one spot.

We claim:

1. An apparatus for detecting misfire in a multicylinder internal combustion engine, comprising:
   a sound pick-up transducer for converting the exhaust sound in the exhaust passage of said engine into an electric signal;
   means for integrating the output of said sound pick-up transducer with a predetermined integration period in synchronism with the rotation of said engine; and
   means for comparing the output signal of said integrating means with a reference signal and for delivering an output when the level of the output of said integrating means is lower than that of said reference signal.

2. An apparatus as claimed in claim 1, comprising means for obtaining a synchronizing signal consisting of pulses which are in synchronism with the rotation of said engine and which are applied to said integrating means to reset said integrating means.

3. An apparatus as claimed in claim 2, wherein said synchronizing signal obtaining means comprises a sensor for detecting pulses generated by the ignition coil of said engine and a synchronizing circuit for delivering synchronizing signal pulses every a predetermined number of said detected pulses.

4. An apparatus as claimed in claim 2, wherein said synchronizing signal obtaining means comprises a sensor for detecting pulses generated by the ignition coil of said engine and applied to one of the ignition plugs of the respective cylinders of said engine by means of a distributor and a synchronizing circuit for delivering said synchronizing signal pulses every said detected pulses.

5. An apparatus as claimed in claim 2, wherein said integrating means comprises an amplifier having a first input terminal to which the output of said sound pick-up transducer is applied, a second input terminal to which a signal of reference level for integration operation is applied, and an output terminal; a capacitor connected between said first input terminal and said output terminal; and a switching circuit having a terminal for receiving said synchronizing signal, connected in parallel with said capacitor and capable of being rendered conductive when said synchronizing signal is applied to said terminal.

6. An apparatus as claimed in claim 2, wherein said integrating means includes a device for compensating the signal of reference level for integration operation during a certain integration period by the average of the integral taken during the immediately previous integration period.

7. An apparatus as claimed in claim 6, wherein said integrating means comprises an amplifier having a first input terminal for receiving the output of said sound pick-up transducer, a second input terminal for receiving a signal of reference level for integration operation and an output terminal; a capacitor connected between said first input terminal and said output terminal; a first switching circuit having a terminal for receiving said synchronizing signal, connected in parallel with said capacitor and capable of being rendered conductive when said synchronizing signal is applied to said terminal; a smoothing circuit having an input terminal connected with said first input terminal; a second switching circuit having a terminal for receiving said synchronizing signal, connected with the output terminal of said smoothing circuit and capable of being rendered conductive when said synchronizing signal is applied to said terminal; and a capacitor connected with said second input terminal of said amplifier and also connected via said second switching circuit with said output terminal of said smoothing circuit.

8. An apparatus as claimed in claim 1, wherein said sound pick-up transducer is disposed in said exhaust passage.

9. An apparatus as claimed in claim 1, wherein said sound pick-up transducer is disposed in a chamber communicating through a small pipe with said exhaust passage.

10. An apparatus as claimed in claim 9, wherein said chamber is provided with a thermal shielding plate opposite to said exhaust passage.

11. An apparatus as claimed in claim 10, wherein said chamber has a heat radiator plate provided on its side wall.

12. An apparatus as claimed in claim 1, further comprising means for shaping the waveform of said output of said second pick-up transducer.

13. An apparatus as claimed in claim 1, wherein said sound pick-up transducer is a microphone.

14. An apparatus for detecting misfire in a multicylinder internal combustion engine, comprising:
   a sound pick-up transducer for converting the exhaust sound in the exhaust passage of said engine into an electric signal;
   first integrating means for integrating the output of said sound pick-up transducer with a first integration period in synchronism with the rotation of said engine;
   second integrating means for integrating the output of said sound pick-up transducer with a second integration period in synchronism with the rotation of said engine; and
   a comparison means for comparing the output of said second integrating means with the output of said first integrating means used as a reference signal and for delivering an output when said output of said second integrating means is smaller by a predetermined value than said output of said first integrating means.

15. An apparatus as claimed in claim 14, comprising means for obtaining a first and a second synchronizing signals, said first synchronizing signal consisting of pulses having a first repetition period in synchronism with the rotation of said engine and applied to said first integrating means for the resetting thereof and said second synchronizing signal consisting of pulses having a second repetition period in synchronism with said rotation of said engine and applied to said second integrating means for the resetting thereof.

16. An apparatus as claimed in claim 15, wherein said synchronizing signal obtaining means comprises a sensor and a synchronizing circuit, said sensor detecting pulses generated by the ignition coil of said engine and said synchronizing circuit having a first terminal for delivering a synchronizing signal pulse each time a first predetermined number of said detected pulses are received and a second terminal for delivering a synchronizing signal pulse each time a second predetermined number of said detected pulses are received.

17. An apparatus as claimed in claim 16, wherein said second predetermined number differs from the number of the cylinders of said engine.

18. An apparatus as claimed in claim 16, wherein said second predetermined number is prime to the number of the cylinders of said engine.

19. An apparatus as claimed in claim 15, wherein each of said first and second integrating means comprises an amplifier having a first input terminal for receiving the output of said sound pick-up transducer, a second input terminal for receiving a signal of reference level for integration operation, and an output terminal; a capacitor connected between said first input terminal and said output terminal; and a switching circuit having a terminal for receiving said synchronizing signal, connected in parallel with said capacitor and capable of being rendered conductive when said synchronizing signal is applied to said terminal.

20. An apparatus as claimed in claim 14, wherein said sound pick-up transducer is disposed in said exhaust passage.

21. An apparatus as claimed in claim 14, wherein said sound pick-up transducer is disposed in a chamber communicating through a small pipe with said exhaust passage.

22. An apparatus as claimed in claim 21, wherein said chamber is provided with a thermal shielding plate opposite to said exhaust passage.

23. An apparatus as claimed in claim 22, wherein said chamber has a heat radiator plate provided on the wall of said chamber.

24. An apparatus as claimed in claim 14, wherein said sound pick-up transducer is a microphone.

* * * * *